Figures 1, 2:
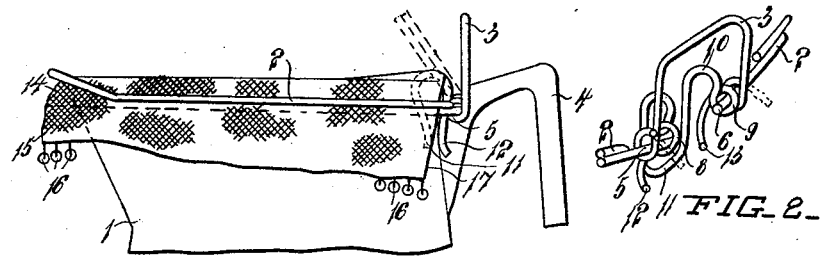

G. W. SHAILER.
LID FOR MILK JUGS AND THE LIKE.
APPLICATION FILED AUG. 1, 1910.

999,887.

Patented Aug. 8, 1911.

Witnesses:
C. S. Brown
M. O. Bender

Inventor:
George W. Shailer
by Foster Freeman Watson &c
Attys

UNITED STATES PATENT OFFICE.

GEORGE WILLIAM SHAILER, OF PALMERSTON NORTH, NEW ZEALAND, ASSIGNOR OF ONE-HALF TO CHARLES COLLIS, OF LONGBURN, NEW ZEALAND, AND DAVID COLLIS AND JOHN COLLIS, BOTH OF KAIRANGA, NEW ZEALAND.

LID FOR MILK-JUGS AND THE LIKE.

999,887. Specification of Letters Patent. Patented Aug. 8, 1911.

Application filed August 1, 1910. Serial No. 574,842.

*To all whom it may concern:*

Be it known that I, GEORGE WILLIAM SHAILER, a citizen of the Dominion of New Zealand, and residing at Palmerston North, in the Provincial District of Wellington, in the Dominion of New Zealand, have invented certain new and useful Improvements in Lids for Milk-Jugs and the Like, of which the following is a specification.

This invention relates to containers such as milk jugs, sugar basins, and the like, and provides a lid whereby insects and dust are excluded from an ordinary milk jug, sugar basin or the like, and in the case of a milk jug, the free escape of gases from the milk contained in the jug is not prevented.

The lid comprises a frame pivoted to a spring clip, which grips the rim of the container, and a cover made of porous washing material held by the frame.

The drawing herewith illustrates the invention:—

Figures 3, 4:
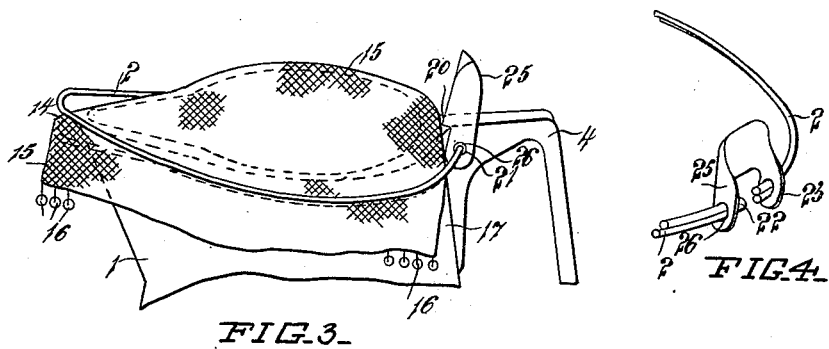

Figure 1, is a part side elevation of a jug with the invention attached. Fig. 2, a perspective view of a spring clip, Fig. 3, a part perspective view of a jug specially made to receive the invention. Fig. 4, a part perspective view of a frame and thumb piece, Fig. 5, a plan of a porous cover, and Fig. 6, a part perspective view of the invention on a larger scale, and as applied to a basin.

Figures 5, 6:
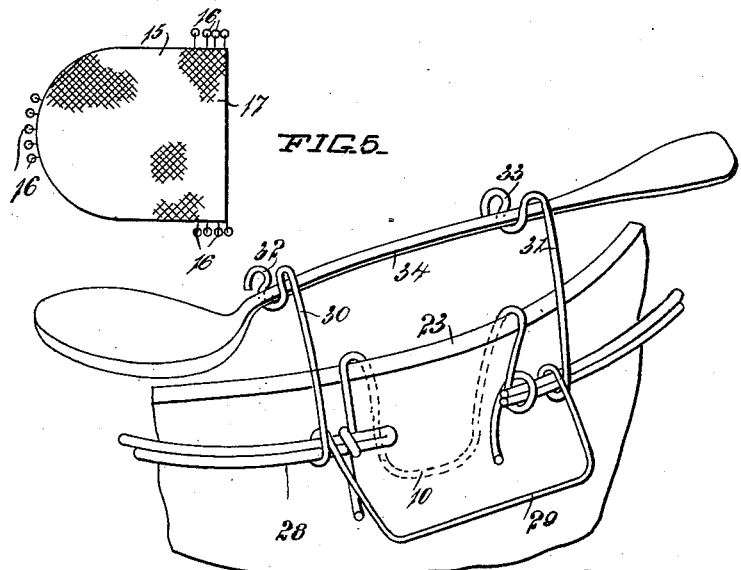

Referring more particularly to Figs. 1 and 2 which show the invention applied to an existing jug 1, the frame 2 is composed of two similar and substantially parallel wire loops or sections bent to conform to the shape of the rim of the jug 1, around which the frame fits freely. The frame 2 is formed from a single piece of wire bent upon itself, as shown in Figs. 4 and 6, or of two pieces which are rigidly united at one end, as indicated in Fig. 2. The lower section or that over which the porous cover hereinafter referred to extends when in use is represented in dotted lines in Figs. 1 and 3. A thumb piece 3 rises from and is fixed to the rear of the frame, and bridges over the handle 4 of the jug. This thumb piece is so formed and connected with the frame that by rocking or swinging it, as for example from the full line position in Fig. 1 to the position shown in dotted lines in such figure, a pull will be exerted upon the frame 2 and particularly upon the upper section thereof so as to bind the fabric cover securely in position. By an opposite shifting movement of the thumb piece an unlocking of the frame is effected. The ends 5 and 6 of one section of the frame 2 project through the thumb piece 3 and form pivots passing into loops 8 and 9 formed in a wire spring clip 10. This clip has a member 11 adapted to pass into, and legs 12 and 13 adapted to pass outside, the rim of the jug. When placed on a jug, the rim thereof is clipped between the member 11 and the legs 12 and 13. The frame is made with a mouth 14 for the ready introduction between the sections thereof of a porous cover 15 which is preferably weighted at the edges with glass beads 16 or the like. The cover is placed in position by drawing its rear edge 17 between the sections of the frame until the whole rim of the jug is well covered, the porous cover being detachably held in place upon the frame by the clamping action of its sections.

Referring now to Figs. 3 and 4, the frame 2 is shown applied to a jug specially made to receive it. In this case, the handle 4 is made continuous along its top part 20, that is to say, without the depression usually found where the handle is joined to the jug. On each side of the handle is formed a recess 21 adapted to receive the ends 22 and 23 of the frame 2, the said ends in this case being made by continuing through the thumbpiece the sections or double thickness of wire forming the frame. The end 23 is fixed to one side of a thumbpiece 25, the other end 22 passing freely through a hole 26 made in the other side of the thumbpiece. The end 23 can be readily withdrawn through the hole 26, while the end 23 is inserted in its recess 21, the said end 22 being afterward inserted in its recess 21.

Referring now to Fig. 6, the clip 10 is shown gripping a basin 28 and the thumbpiece 29 extends downwardly so that when the frame is raised to its proper height for removing the contents of the basin, the lower part of the thumbpiece comes into contact with the basin. The frame can thus be opened so far only as that it will close upon the basin, after the thumbpiece has been released. In this Fig. 6, the thumbpiece 29 is made with upward extensions 30 and 31 having hooks 32 and 33 to form brackets wherein a spoon 34 may be supported.

The porous covers 15 are preferably woven in a continuous band, a new cover being cut off as required.

What I do claim and desire to secure by Letters Patent of the United States is:—

1. The combination with a container, of a frame pivoted thereto and consisting of two substantially parallel sections, and a cover detachably clamped in place between said sections.

2. The combination with a container, of a frame pivoted thereto and consisting of two substantially parallel yielding sections, a porous cover detachably clamped in place between said sections, and means for swinging said frame upon its pivot.

3. The combination with a container, of a frame pivoted thereto and consisting of two similar wire sections conforming to the shape of the container, and a porous cover clamped between said sections.

4. The combination with a container, of a clip secured thereto, a frame pivoted to said clip and consisting of two similar sections conforming to the shape of the container, and a porous cover detachably clamped between said sections.

5. The combination with a container, of a spring clip adapted to engage the edge thereof, a frame pivoted to said clip and consisting of two similar yielding sections, a porous cover detachably clamped between said sections, and a thumb-piece secured to the frame for swinging it on its pivot.

6. A lid of the kind described, comprising a pivoted frame made of a double thickness of wire bent to form a mouth, and porous material held by the frame, as set forth.

7. A lid of the kind described, comprising a pivoted frame, a thumbpiece secured to the frame, upward extensions upon the thumbpiece and terminating in hooks and porous material held between the wires, as set forth.

In testimony whereof I affix my signature in presence of two witnesses.

GEORGE WILLIAM SHAILER.

Witnesses:
ERNEST SMITH BALDWIN,
JOHN JOSEPH WATSON.

---

Copies of this patent may be obtained for five cents each, by addressing the "Commissioner of Patents, Washington, D. C."